United States Patent
Remmereit

(12) 
(10) Patent No.: US 6,203,843 B1
(45) Date of Patent: *Mar. 20, 2001

(54) BULK ANIMAL FEEDS CONTAINING CONJUGATED LINOLEIC ACID

(75) Inventor: Jan Remmereit, Volda (NO)

(73) Assignee: Natural Nutrition Ltd., Sandulka (NO)

( * ) Notice: Subject to any disclaimer, the term of this patent is extended or adjusted under 35 U.S.C. 154(b) by 0 days.

This patent is subject to a terminal disclaimer.

(21) Appl. No.: 09/506,128

(22) Filed: Feb. 17, 2000

Related U.S. Application Data

(63) Continuation of application No. 09/027,075, filed on Feb. 20, 1998, now Pat. No. 6,042,869.

(51) Int. Cl.$^7$ ...................................................... A23L 1/20

(52) U.S. Cl. ............................... 426/630; 426/2; 426/80; 426/489; 426/492; 426/635; 426/807; 554/12; 514/558; 514/560

(58) Field of Search .................................. 426/630, 2, 80, 426/489, 492, 635, 807; 554/12; 514/558, 560

(56) References Cited

U.S. PATENT DOCUMENTS

| | | | |
|---|---|---|---|
| 2,242,230 | 5/1941 | Burr et al. | 260/405.6 |
| 2,350,583 | 6/1944 | Bradley | 260/405.6 |
| 3,162,658 | 12/1964 | Baltes et al. | 260/405.6 |
| 3,278,567 | 10/1966 | Rathjen et al. | 260/405.6 |
| 3,650,677 | 3/1972 | Mauter et al. | 21/2.5 |
| 3,729,379 | 4/1973 | Emken | 195/30 |
| 4,164,505 | 8/1979 | Krajca | 260/405.6 |
| 4,179,454 | 12/1979 | Mehta et al. | 260/409 |
| 4,381,264 | 4/1983 | Struve | 260/405.6 |
| 4,678,580 | 7/1987 | Brady et al. | 210/490 |
| 5,017,614 | 5/1991 | Pariza et al. | 514/558 |
| 5,070,104 | 12/1991 | Pariza et al. | 514/549 |
| 5,208,356 | 5/1993 | Pariza et al. | 554/79 |
| 5,286,399 | 2/1994 | Howell et al. | 252/88 |
| 5,428,072 | 6/1995 | Cook et al. | 514/560 |
| 5,430,066 | 7/1995 | Cook et al. | 514/560 |
| 5,554,646 | 9/1996 | Cook et al. | 514/560 |
| 5,585,400 | 12/1996 | Cook et al. | 514/560 |
| 5,674,901 | 10/1997 | Cook et al. | 514/558 |
| 5,725,873 | 3/1998 | Cook et al. | 424/442 |
| 5,773,391 | 6/1998 | Lawate et al. | 508/257 |

FOREIGN PATENT DOCUMENTS 558881   10/1944   (GB).

OTHER PUBLICATIONS

Radlove et al., "Catalyst Isomerization of Evgetable Oils," *Ind. Eng. Chem.* 38 (10):997–1002 (1946).
Braac, "Degumming and Refining Practices in Europe," *JAOCS* 53:353–357 (1976).
Burkhardt, Phospharides Isolated From Seeds of Commercial and Experimental Safflower Varieties, *JAOCS* 48:697–99 (1971).
Ensminger et al., "Feeds & Nutrition," 2nd Ed., Ensminger Publishing Co., Clovis CA 394:395, 507–43, 574–83 (1990).
Chin et al., "Dietary Sources of Conjugated Dienoic Isomers of Linoleic Acid, a Newly Recognized Class of Anticarcinogens," *J. Food. Comp. Anal.* 5:185–197 (1992).
Sebedio et al., "Metabolites of Conjugated Isomers of Linoleic Acid (CLA) in the Rat," *Biochem. Biophys. Acid* 1345:5–10 (1997).
Clement, I., "Review of the Effects of Trans Fatty Acids, Oleic Acid, n–3 Polyunsaturated Fatty Acid, and Conjugated Linoleic Acid on Mammary Carinogenesis in Animals," *Am. J. Clin. Nutr.* 66 (Suppl.):1523S–9S (1997).
Sebedio et al., "Linoleic Acid Isomers in Heat Treated Sunflower Oils," *JAOCS* 65(3):362–366 (1988).
Holman et al., "Unusual Isomeric Polyunsaturated Fatty Acids in Liver Phospholipids of Rats Fed Hydrogenated Oil," *PNAS* 88:4830–34 (1991).
Bradley et al., "Alkali–Induced Isomerization of Drying Oils and Fatty Acids," *Ind. Eng. Chem.* 34 (2):237–42 (1942).
Cowan, J.C., "Isomerization and Trans–Esterification," *JAOCS* 492–499 (1950).
Belury, M.A., "Conjugated Dienoic Linoleate: A Polyunsaturated Fatty Acid with Unique Chemoprotective Properties," *Nat. Rev.* 53 (4):83–9 (1955).
Park et al, "Effect of Conjugated Linoleic Acid on Body Composition in Mice," *Lipids* 32 (8):853–58 (1997).
Christie et al., "Isomers in Commercial Samples of Conjugated Linoleic Acid," *JAOCS* 74(11):1231 (1997).
Lie Ken Jic et al., "Synthesis and Nuclear Magnetic Resonance Properties of All Geometrical Isomers of Conjugated Linoleic Acids," *Lipids* 32 (10):1041–44 (1997).
Schat et al., "Silver–Ion High–Performance Liquid Chromatographic Separation and Identification of Conjugated Linoleic Acid Isomers," *Lipids* 33(2):271–221 (1998).
Lie Ken Jie et al, "High–Resolution Nuclear Magnetic Responance Spectropscopy—Applications to Fatty Acids and Triacylglyorols," *Lipids* 32(10):1019–1034 (1997).
Willett et al., "Trans Fatty Acids: Are the Effects Only Marginal'", *Am. J. Public Health* 84(5):722–24 (1994).
Burkhardt, H.J., "The Phospharides of Safflower Seeds Involved in Color Formation Occuring in Extracted and Heated Crude Oils," *JAOCS* 47:69–72 (1970).
Itoh et al., "Sterol Compositon of 19 Vegetable Oils," *JAOCS* 50:122–25 (1973).
Smiles et al., "Effect of Degumming Reagents on the Recovery and Nature of Lecithins From Crude Canola, Soybean and Sunflower Oils," *JAOCS* 65(7) 1151–55 (1988).

*Primary Examiner*—Chhaya D. Sayala

(57) ABSTRACT

A conjugated linoleic acid is prepared in industrial scale as a hydrolyzed isomerized product for blending into bulk domestic animal feeds. The CLA-containing isomerized hydrolyzed oil from sunflower and safflower seeds has sufficiently low levels of phosphatides and sterols to permit crude processing and incorporation into feeds of an undried, undistilled oil fraction without toxic or unpalatable effects.

2 Claims, No Drawings

BULK ANIMAL FEEDS CONTAINING CONJUGATED LINOLEIC ACID

This is a Continuation of application Ser. No. 09/027,075 filed on Feb. 20, 1998 now U.S. Pat. No. 6,042,869.

FIELD OF THE INVENTION

This invention relates to a new use of conjugated linoleic acid in animal feeds. The conjugated linoleic acid is manufactured in an industrial scale process from seed oils such as sunflower oil and safflower oil, which contain non-fatty acid residues low enough to avoid final purification by distillation, but still pure enough to be safely fed to animal in bulk feed.

BACKGROUND OF THE INVENTION

Processes for the conjugation of the double bonds of polyunsaturated unconjugated fatty acids have found their main application in the field paints and varnishes. Oils comprised of triglycerides of conjugated fatty acids are known as drying oils. Drying oils have value because of their ability to polymerize or "dry" after they have been applied to a surface to form tough, adherent and abrasion resistant films. Tung oil is an example of a naturally occurring oil containing significant levels of conjugated fatty acids.

Because tung oil is expensive for many industrial applications, research was directed towards finding a substitute. In the 1930's, it was found that conjugated fatty acids were present in oil products subjected to prolonged saponification, as originally described by Moore, J. Biochem., 31: 142 (1937). This finding led to the development of several alkali isomerization processes for the production of conjugated fatty acids from various sources of polyunsaturated fatty acids.

In alkali isomerization the fatty acids are exposed to heat, pressure and a metal hydroxide or oxide in nonaqueous or aqueous environments, resulting in the formation of conjugated isomers. Other methods have been described which utilize metal catalysts, which is not as efficient in the production of conjugated double bonds. It was found that isomerization could be achieved more rapidly in the presence of higher molecular weight solvent. Kass, et al., J. Am. Chem. Soc., 61: 4829 (1939) and U.S. Pat. No. 2,487,890 (1950) showed that replacement of ethanol with ethylene glycol resulted in both an increase in conjugation in less time. U.S. Pat. No. 2,350,583 and British Patent No. 558,881 (1944) achieved conjugation by reacting fatty acid soaps of an oil with an excess of aqueous alkali at 200–230 degrees C. and increased pressure.

Among the processes known to effect isomerization without utilizing an aqueous alkali system, is a nickel-carbon catalytic method, as described by Radlove, et al., Ind. Eng. Chem.38: 997 (1946). A variation of this method utilizes platinum or palladium-carbon as catalysts.

Purified conjugated linoleic acid ("CLA") has recently been shown in several studies to have unique properties when used as a food additive. Purified CLA appears to affect fat deposition in animals. Purified CLA both increases the lean to fat ratio, effectively reducing body fat, and increases feed conversion efficiency. An additional advantage of feeding CLA is that it appears to modulate immune responses under certain conditions. In laboratory animal studies CLA has been shown to prevent weight loss due to immune stimulation and to treat immune hypersensitivity.

The purified CLA utilized in prior studies as an animal feed additive was obtained by small scale laboratory procedures involving production of CLA from highly purified linoleic acid. Laboratory and pilot scale oil refining systems have been described for preparation of purified seed oils. For example Sullivan, J. Am. Oil Chemists' Soc., 53: 359 (1976), describes a laboratory semi-pilot steam refining system made entirely of glass.

While these systems are adequate for producing quantities of conjugated fatty acids for laboratory studies, or even clinical trials, they are not suitable for commercial scale bulk production. On the other hand, the large scale systems available to produce industrial quantities of conjugated acids, as in classical drying oils, cannot be run inexpensively enough to produce material for bulk animal feeds. The standard degumming, refining, and dehydration steps necessary to obtain nutritionally safe edible conjugated oils for livestock feeding, are prohibitively complex and expensive. (See Braae, J. Am. Oil Chemists' Soc., 53: 353 (1976) for a discussion of complex degumming processes as practiced on a commercial scale in Europe). Also there are significant losses of product through polymerization of conjugated fatty acids or their precursors at high temperatures.

Economical CLA production in commercial quantities for use in domestic food animal feeds is a desirable objective in light of the nutritional benefits realized on a laboratory scale. Preferably, the CLA is produced directly from a source of raw vegetable oil and not from expensive purified linoleic acid. Further, the process must avoid cost generating superfluous steps, and yet result in a safe and wholesome product palatable to animals.

SUMMARY OF THE INVENTION

In the present invention, a feed safe conjugated linoleic acid is manufactured according to a method otherwise used for producing an industrial grade conjugated product for use in paint and varnish. Typically, residues (i.e. the chemically modified end products resulting from heat and pressure) derived from non-oil components of seed oils, such as sterols and phosphatides, form unpalatable, or even toxic by-products under processing conditions. Generally seed oils such as corn or soy bean oil must be extensively degummed, and the sterols and phosphatides are meticulously removed in a series of purification steps to avoid fouling of equipment, and to recover a wholesome product. In addition to removal of impurities and by-product polymerized or carmelized material during processing, it is necessary to acidify and finally distill the oil to obtain product of requisite purity for use in food. Subjecting the oil to isomerization causes further impurities, and requires even more rigorous decontaminating and by-product removal.

Surprisingly, the Applicant has discovered that a complex purification scheme for producing a feed safe conjugated linoleic-containing oil is not necessary, if the starting material is an oil having less than 0.5 percent phosphatides, and an unsaponifiable sterol fraction containing less than 20 percent each of campesterol and stigmasterol. According to this criteria, sunflower and safflower oil are suitable starting oils for production of the present feed safe CLA enriched oil, but soybean oil or corn oil are not suitable because of the high unsaponifiable content, and also high levels of linolenic acid that tends to readily polymerize. It is further desirable to have a starting oil with a high linoleic acid content, so that the final product has a correspondingly high CLA content.

The present invention encompasses the new use in domestic animal feed of conjugated linoleic acid produced from a seed oil, especially sunflower and safflower oils, but not soybean or corn oils, having a linoleic acid content of at least 50 percent produced by an industrial scale process in which the crude oil is subjected to the steps of solvent extracting, as with hexane, alcohols, or polyols known in the art, fat splitting, treating with aqueous alkali to effect at least 50 percent isomerization of the double bonds of linoleic acid to form conjugated linoleic acid at low temperatures below about 230 degrees F., and preferably below about 215 degrees F., acidifying with a mineral acid, and separating the oil fraction from the majority of the aqueous fraction without a distillation step.

In the conjugation of linoleic by isomerization of the double bonds, the fat splitting step releases the free fatty acids from the glycerol backbone molecule. After the alkali treatment step followed by acidification, several water wash steps may be required to remove salts, and then the water content of the oil fraction can be reduced (after simple decanting the upper fat layer) by conventional centrifugation methods to a content of less than 10 percent. The presence of some water will not interfere with animal feed formulating. In fact, the presence of some water aids the mixing and homogenization step, and provides a source of steam during extrusion.

The animal feeds of the present invention are compounded from the conventional ingredients in rations typical for the species and age of the domestic animal to be fed, in addition to from 0.2 to 5.0 percent of a sunflower or safflower oil having a total C18:2 content of 50–80 percent in which at least 50 percent of the linoleic acid has been isomerized to the conjugated linoleic acid form. Such feeds retain their palatability and wholesomeness even though the CLA containing oil is obtained by an industrial process normally reserved for production of drying oils for paint and varnish. One principal advantage in this new use, is that animal feeds containing nutritionally effective amounts of CLA to achieve reduced body fat content, and firmer fat content in pork, become economically feasible when the CLA can be manufactured in quantities of at least 5 tons per batch or continuous uninterrupted run, without expensive purification and distillation steps.

DETAILED DESCRIPTION OF THE PREFERRED EMBODIMENT

The present invention relates to the large scale, commercial production of an edible conjugated fatty acid product from crude extracted sunflower or safflower oil. Processes for conjugating polyunsaturated fatty acids have been developed by the paint and varnish industry. Conjugated fatty acids were required for the production of drying oils. These drying oils need not be of edible grade, and therefore no purification is required to remove impurities which do not affect their drying function. Recently, purified conjugated linoleic acid ("CLA") has been shown to be effective in increasing feed efficiency and increasing the lean to fat ratio of animals. CLA has been shown to be effective in increasing the lean to fat ratio in animals as disclosed in U.S. Pat. No. 5,554,646, increasing the feed efficiency of animals as disclosed in U.S. Pat. No. 5,428,072, and tempering adverse effects of the immune response as disclosed in U.S. Pat. Nos. 5,430,066 and 5,585,400. The foregoing patents are herein incorporated by reference. In order to realize the commercial potential of CLA for these purposes, it is necessary to produce large quantities of a CLA product at a low cost so that it can be adapted to domestic animal feed rations.

Various methods of producing conjugated double bonds by alkali isomerization are known in the art. U.S. Pat. No. 2,350,583 (Bradley, 1944) describes a method of producing conjugated fatty acids by aqueous alkali isomerization. This method resulted in the conjugation of about 50% of the double bonds present in the polyunsaturated fatty acids used. U.S. Pat. No. 2,242,230 (Burr et al., 1941) describes a method of non-aqueous alkali conjugation of fatty acids, resulting in the conjugation of approximately 100 percent of the double bonds in the polyunsaturated fatty acids studied. Another process resulting in the efficient formation of conjugated double bonds is described in U.S. Pat. No. 4,381,264 (Struve, 1983). There, the inventors treat polyunsaturated fatty acids with $SO_2$ in the presence of substoichiometric amounts of soap forming bases. Perhaps the most commercially viable method for producing large quantities of conjugated fatty acids is the continuous flow aqueous alkali isomerization process described in U.S. Pat. No. 4,164,505. This process results in essentially all available double bonds being conjugated in a short reaction time. The foregoing patents are incorporated herein by reference.

The present invention describes the use as a feed ingredient of a CLA produced by a combination of the continuous countercurrent fat-splitting process and the continuous flow alkali isomerization process.

CLA, so produced, is a mixture of the conjugated isomers of polyunsaturated fatty acids found in sunflower or safflower oil. Therefore, the conjugated fatty acids will contain conjugated isomers predominantly of linoleic acid and to a lesser extent linolenic acid. CLA is a mixture of one or all of the isomers of octadecadienoic acid including the cis-9, trans-11; cis-9, cis-11; trans-9, cis-11; trans-9, trans-11; cis-10, cis-12; cis-10, trans-12; trans-10, cis-12; and trans-10, trans-12 isomers. The cis-9, trans-11 and trans-10, cis-12 isomers are thought to possess most of the biological activity. Preparations of CLA which contain primarily these isomers are thus preferred. In general, it is preferred that the fatty acid preparation contain at least 50% CLA and have a ratio of cis-trans isomers of CLA to trans-trans isomers of CLA of about 5.1 to 8.1.

Crude sunflower or safflower oil is the preferred fatty acid source for producing CLA. Sunflower oil contains a high amount of linoleic acid (about 65% on average). Safflower oil typically contains even higher amounts (greater than 70%). Preferably, a hexane extract of crude, non-degummed oil is the starting substrate for conjugated fatty acid product CFAP production. This extract is commercially available and is the same quality as the oil used as the starting point for edible products. The ability to use raw sunflower or safflower oil as the starting substrate provides an important economic advantage because it is less expensive than refined sunflower oil.

Applicants have discovered that other raw oils, such as raw corn and soybean oils, are not suited to the present new use of CLA in bulk feeds because of the production of polymerized products during the fat splitting and conjugation processes, and because of the high phosphatide content. Also, certain sterols such as campesterol and stigmasterol are known to have a tendency to foul processing equipment during conjugation and plug nozzles during materials transfer. The polymerization by-products also result in loss of yield from these other oils, even though at first glance the other oils may seem to have more desirable properties. Corn oil (about 56% linoleic acid) and soybean oil (about 50–55% linoleic acid) have comparable linoleic acid contents as compared to sunflower oil (about 60% linoleic acid). These oils are inexpensive and large quantities are available, which make them attractive candidates as a potential source of CLA for bulk feeds. However, their use for commercial CLA production is substantially lower per unit quantity of oil because the ultimate yields of CLA are lower than for sunflower or safflower oil, and because of the added expense for additional cleaning and purification steps.

Heat sensitive triglycerides containing multiple double bonds are abundant in oils having an iodine value above 120. Oils containing such heat-sensitive triglycerides have a tendency to form polymers when subjected to continuous countercurrent fat-splitting. These polymers become insoluble in oil and will foul equipment, resulting in lowered efficiencies of splitting and yields. Sunflower oils are classified as heat-sensitive because of their high linoleic acid content and iodine number. Sunflower oil has an iodine number of 130; safflower oil of about 145. Soybean oil has an iodine number of about 132, and corn oil has an iodine number of about 130. All these oils have high linoleic acid contents and iodine numbers above 120, thus belonging to the heat-sensitive group. It is therefore surprising that sunflower and especially safflower oils can be split and conjugated by commercial processes with few processing complications.

The second cause of lower yields relates to the level of impurities present in unrefined oil. Crude oils contain relatively high amounts of various impurities such as phospholipid, proteinaceous and mucilaginous matter, carbohydrates, pigments, waxes and insoluble. It is normally necessary to degum and then alkali or mechanically refine these oils to remove the impurities. Degumming involves treating the crude oil with water to hydrate and precipitate phosphatides and gummy mucilaginous substances. The prevalent phosphatides are phosphatidylethanolamine, phosphatidyliniositol and phosphatidylcholine. The phosphatide content of sunflower and safflower oils is about 0.4 to 1.0% as reported in Klein and Crauer, JAOCS 51:382A–385A and Burkhardt, JAOCS 48:697–699 (1971), respectively. In contrast, the phosphatide content of soybean oil is about 1.5–2.5% as reported in the Handbook of Soy Oil Processing and Utilization, Erickson et al. eds., AOCS, Champaign, 1980. For crude oils with low amounts of these substances, such as sunflower and safflower oils, proceeding can advance directly to caustic refining, after degumming.

As described above, oils are generally degummed by precipitation after hydration with water. It can be expected that gums in the crude sunflower oil utilized in the present invention would be hydrated during both the fat-splitting and aqueous isomerization processes. Such precipitates may be the cause the fouling of the equipment. Sunflower oil and safflower oil generally contain similar amounts of phosphatides and could be expected to behave similarly in processing.

The presence of phosphatides in the crude oil also raises other concerns. It is well known in the art that phosphatides in oils may be charred when subjected to steam refining or deodorization and bleaching. These phosphatides may be present in the oil even after repeated treatment with caustic soda. The residual phosphatides cause poor taste and low oxidative stability as discussed in Braae, JAOCS 53:353–357 (1976). The counter-current fat-splitting and continuous flow aqueous isomerization processes utilized in most modern processes share several common aspects with steamrefining and deodorization including operation at high temperatures and the presence of steam. Therefore, it could be expected that phosphatide residues present with the free fatty acids produced by fat-splitting and carried over to and not removed by the isomerization process would cause poor taste and oxidative instability in the CLA containing oil. For a comparison of sunflower/safflower oil and corn/soybean oil, refer to Table 1.

| COMPARISON OF CONTAMINANTS | | |
| --- | --- | --- |
| Phosphatides | | |
| Soybean | 1.5–3.0% | |
| Sunflower | .4–1% | |
| Sunflower | .4–1% | |
| Sterols (unsapanifiables by percent) | | |
| Soybean | Sunflower | Sunflower |
| Campesterol 20* | Campesterol 8 | Campesterol 13 |
| Stigmasterol 20 | Stigmasterol 8 | Stigmasterol 9 |
| β-Sitosterol 53 | β-Sitosterol 60 | β-Sitosterol 52 |
| $\Delta^5$ Avensterol 3 | $\Delta^5$ Avensterol 4 | $\Delta^5$ Avensterol 1 |
| $\Delta^7$ Stigmasterol 3 | $\Delta^7$ Stigmasterol 15 | $\Delta^7$ Stigmasterol 15 |
| $\Delta^7$ Avenasterol 1 | Avenasterol 4 | Avenasterol 3 |
| Percentage of 0.36 percent total Total *May not equal 100 | | |
| 0.36% total in oil | 0.36% | 0.36% |
| | Soybean | Sunflower | Sunflower |
| Iodine Value | 134.6 | 135.4 | 143.6 |
| Saponification value | 190.7 | 190.6 | 190.3 |
| Unsaponification value | .6 | .7 | .6 |

The first step in the production of bulk animal feed containing CLA is hydrolysis of the raw sunflower oil to form free acids and glycerol. The preferred fat-splitting process is a version of the Colgate-Emery process described in Sonntag, *Fatty Acids in Industry,* Fat Splitting and Glycerol Recovery, Johnson and Fritz, eds., Marcel Dekker, Inc., New York, pp 23–72 (1989), incorporated herein by reference. This process involves the countercurrent reaction of water and fat under high temperatures and pressures.

The equipment used for this process is standard in the industry. The equipment consists of a highly elongated, cylindrical-shaped tower about 20 to 48 inches in diameter and 60 to 80 feet high. The tower is made of stainless steel or some other corrosion resistant material and can withstand operating pressures of about 750 psig.

In operation, the raw sunflower or safflower oil is pumped into the tower by means of a sparge ring about 3 feet from the bottom of the tower. Water is introduced near the top of the column at about 40 to 50% of the weight of the fat. The sunflower oil rises through the hot glycerol-water collecting section at the bottom of the column and passes through the oil-water interface into the continuous phase where the hydrolysis takes place in the oil layer. Direct injection of high pressure steam is used to maintain the temperature at 250° C. Pressure is maintained at about 700 to 750 psig.

Pressure in the column is maintained by means of a back-pressure control valve in the fatty acid discharge line. The level of the interface is maintained by controlling the discharge of the water phase. Close control of the heat exchange at each end of the column is essential for efficient separation because of the solubility of water in fatty acids and of the fatty acids in glycerine water at the extremely high operating temperatures.

The second major step in the process is conjugation. Preferably, the continuous flow aqueous alkali isomerization process is used. This process is described in U.S. Pat. No. 4,164,505, incorporated herein by reference.

The alkaline reagent used in the process is any water soluble alkali metal hydroxide, for example NaOH or KOH. The alkali must be provided well above stoichiometric excess, preferably greater than about a 50–100% excess.

The fatty acids derived from the continuous countercurrent fat-splitting process are charged with the metal hydroxide into a flow reaction zone maintained in many conventional processes at a pressure of about 25–300 psi and a temperature of about 230° C. In the recommended method of isomerization, low temperatures in the 210–220° C. range should be maintained to avoid predominance of trans isomers. Retention times may be increased commensurating to retain yields. Sufficient water must be admitted to the flow reaction zone so that the alkali metal salts which are formed remain in solution. The total time in the reaction zone is preferably about 30 minutes, or longer at decreased temperatures. Typical flow rates are about 10 liters/minute. The flow reaction zone can generally take the from simple tubular flow reactor provided with an inlet for feeding in the sunflower fatty acids, and outlet for removing CFAP, and a means to monitor the composition of the reaction product.

Next, the preparation is acidulated in a batch reactor. Preferably, diluted sulfuric acid is added to the mixture to neutralize the strong alkali. The bottom layer containing sodium sulphate is removed. Then, the remaining fatty acid layer is washed with water and dried under a vacuum at about 80° C. to 100° C. For the production of edible conjugated fatty acid product, a distillation step is not needed.

Example 1 shows the composition of a typical CLA-containing isomerized sunflower oil produced by the above processes. The ratio of cis-trans to trans-trans isomers was greater than 7:1.

This oil produced by the combination of the continuous countercurrent fat-splitting and continuous flow alkali isomerization processes may be added to animal feed formulations as a source of CLA.

Many different feed rations may be formulated for animals from many different feed ingredients. Rations are generally formulated to provide-nutrients in accordance with National Research Council standards. The feedstuffs used in the ration are chosen according to market price and availability. Thus, some components of the ration may change over time. In the feeds of the present invention, the ration will always contain CLA-containing isomerized sunflower or safflower oil in a concentration of 0.05–5.0 percent, but other components may vary over time based on the price of the component. For discussions on feed ration formulation, actual rations and NRC guidelines, see Church, *Livestock Feeds and Feeding,* O&B Books, Inc., Corvallis Oreg. (1984) and *Feeds and Nutrition Digest,* Ensminger, Oldfield and Heineman eds., Ensminger Publishing Corporation, Clovis, Calif. (1990), incorporated herein by reference.

The animal feed rations of the present invention may be characterized according to NRC requirements. NRC requirements may be found in Church, *Livestock Feeds and Feeding,* O&B Books, Inc., Corvallis Oreg. (1984), or other nutritional standards. Hog and other animal rations are traditionally balanced using the protein and energy requirements, and then adjusted if needed to meet the other requirements. The hog and other feeds of the present invention will contain about 0.05% to 5% lipids plus other feed materials necessary to balance the feed to meet the NRC requirements for the different stages of growth and maintenance. Preferably, the ration will contain about 0.1 to 1.0% CLA-containing isomerized hydrolyzed oil and most preferably about 0.25–0.5%. The amount of oil incorporated into the ration is not critical as long as it is enough to be effective in decreasing body fat and increasing feed efficiency or eliciting other desirable responses.

The relative amounts of protein and energy are adjusted to reflect Nutritional Standards requirements. The amounts of feed components will vary with the stage of animal fed. A growing ration for young animals will have higher protein levels, while a finishing ration for finishing animals for market will have higher energy values which are supplied by carbohydrates. For example, hog prestarter, starter and grower-finisher rations will generally contain about 20–24% protein, 18–20% protein and 13–17% protein respectively. In some feeding situations, care must be taken to provide the appropriate amino acids as well as overall protein content. For example, hogs fed large amounts of corn must have adequate lysine made available in the ration. In most animal diets, energy requirements are met by starches in cereal grains. Energy requirements may also be met by addition of fat to the ration. In the present invention, the CFAP provides part of the energy requirement. Addition of fat to hog rations has been proven to increase growth rate slightly. Feed intake is reduced and feed efficiency is improved when fat is added to the ration. Since feed intake is reduced when fat is added, it important to increase the level of protein so that the daily intake of protein is maintained. In general, the protein level should be increased by 0.2% for every 1% addition of dietary fat.

The CLA-containing isomerized hydrolyzed oil in the rations of the present invention meets the definition of hydrolyzed fat contained in the 1997 Official Publication, Association of Feed Control Officials Incorporated (1997). Feed grade hydrolyzed soap making. It consists predominantly of fatty acids, and must contain not less than 85% fatty acids, not more than 6% unsaponifiable matter, and not more than 1% insoluble impurities. The oil used in the present invention is hydrolyzed sunflower oil (fat) produced by the combination of the commercial countercurrent fat-splitting and continuous flow alkali isomerization processes, or commercial variation thereof in common use. During these processes, the raw sunflower or safflower oil is hydrolyzed and conjugated to form a hydrolyzed fatty acid product.

Other ingredients may be added to the feed ration. These ingredients include, but are not limited to, mineral supplements such as calcium, phosphorus, salt, selenium and zinc; vitamin supplements such as Vitamins A, B, D, E, and K; amino acid supplements such as lysine; coccidiostats, except in hog feeds, or growth promoters such as bacitracin or virginamycin; and other active drugs such as chlortetracycline, sulfathiozole, and penicillin. For vitamin, mineral and antibiotic supplement formulation see Church, *Livestock Feeds and Feeding,* O&B Books, Inc., Corvallis Oreg. (1984).

In a preferred embodiment, the oil is incorporated into a pelleted feed for administration to domestic animals. Pelleted feed is created by first mixing feed components and then compacting and extruding the feed components through a die with heat and pressure. The feed is pelleted by methods known in the art, which are described in MacBain, *Pelleting Animal Feed,* American Feed Manufacturers Association, Arlington, Va. (1974), incorporated herein by reference. When incorporating added fat into pelleted feed, caution is needed in order to avoid making mealy pellets. Generally, only about 2% of the fat is added during pelleting, with the rest added after the pellets have cooled. Alternatively, the CLA-containing isomerized hydrolyzed oil could be added directly to a simple crushed or blended feed ration. Alternatively, the CLA-containing isomerized hydrolyzed oil could be added directly to a simple crushed or blended feed ration.

The oil and the feed containing the oil may be stabilized by the addition of antioxidants. Therefore, antioxidants may be added as chemical preservatives in accordance with F.D.A. regulations as listed in the 1997 Official Publication, Association of Feed Control Officials Incorporated (1997), herein incorporated by reference. Suitable antioxidants include, but are not limited to: Lecithin, tocopherols, ascorbate, ascorbyl palmitate and spice extracts such as rosemary extract.

Rations containing edible CFAP may also be formulated for animals other than hogs. The amount of CFAP administered is not critical as long as it is enough to be effective in decreasing body fat and increasing feed efficiency or other benefits. The feeds are formulated as above, and tailored to the requirements of the animal to be fed in accordance with NRC guidelines. For example, feeds may be formulated for dogs, cats, poultry and cattle. Various rations are given in the examples. Various feed formulations, balancing methods and requirements for these animals are discussed in Church, *Livestock Feeds and Feeding,* O&B Books, Inc., Corvallis Oreg. (1984) and *Feeds and Nutrition Digest,* Ensminger, Oldfield and Heineman eds., Ensminger Publishing Corporation, Clovis, Calif. (1990), incorporated herein by reference. It should be borne in mind that feed companies and livestock producers develop their own nutritional requirements based on historical results. The present invention makes the use of CFAP possible in these various feeds because the CFAP may be produced economically in bulk quantities.

The oil containing feed must be palatable to domestic animals, especially hogs consuming the feed. Hogs are known to have acute olfactory senses and to refuse feed with undesirable odors. Therefore, it is surprising that a process used to produce drying oils in varnishes and paints can be adapted to produce a feed additive that is both safe to feed and palatable to hogs.

The CLA may also be utilized in oil form produced by reesterification to glycerol, or a powder or gel of the free fatty acid. Additionally, the CLA may be derivitized to form a non-toxic salt, such as a potassium or sodium salt, which is formed by reacting chemically equivalent amounts of the free acids with an alkali hydroxide at a pH of about 8 to 9.

The following Examples further illustrate the invention.

EXAMPLE 1

Raw sunflower oil extracted by conventional hexane methods was subjected to continuous countercurrent fat-splitting at high pressure (50 bar) and high temperature (250° C.). The free fatty acids were then conjugated in a continuous flow reactor with addition of NaOH at low temperature (220° C.) for approximately 30 minutes. The conjugated fatty acid product was acidulated with sulfuric acid, the fatty acid layer retained and washed with water, and dried under a vacuum at about 80° C. to facilitate GC analysis the fatty acid product was distilled. The distillate was analyzed by gas chromatography with a Perkin Elmer Autosystem GC. The combination continuous countercurrent fat splitting and continuous alkali isomerization process resulted in the production of a CFAP containing predominantly cis-trans isomers of CLA as shown in Table 1. Table 2 compares just the components of CLA.

TABLE 2

Components of CFAP

| Component Name | Height (uV) | Area (%) |
|---|---|---|
| c 16:0 | 27040.43 | 4.51 |
| c 18:0 | 13872.05 | 3.03 |
| c 18:1 c9 | 23310.18 | 4.74 |
| c 18:2 | 62558.95 | 21.06 |
| c9,t11/t9, unknown | | |
| c 18:2 unknown | 46693.44 | 12.41 |
| c 18:2 t10 | 74414.84 | 14.71 |
| c12/c10, t12 | 5796.95 | .86 |
| c 18:2 c9, c11 | 10147.05 | 1.63 |
| c 18:2 c10, c12 | 12555.32 | 2.25 |
| c 18:2 t9,t11/t10, t12 | 25729.06 | 4.60 |

TABLE 3

CLA Components

| Peak # | Time (min) | Component Name | Height (uV) | Area % |
|---|---|---|---|---|
| 19* | 77.636 | c9,t11/t9 c10 | 62558.95 | 35.54 |
| 20 | 78.254 | | 46693.44 | 20.96 |
| 21 | 78.550 | t10 c12/c10, t12 | 74414.84 | 24.84 |
| 22 | 78.780 | | 5796.95 | 1.46 |
| 23 | 78.952 | c9,c11 | 10147.05 | 2.75 |
| 24 | 79.194 | c10,c12 | 12555.32 | 3.79 |
| 25 | 79.365 | | 5944.40 | 1.36 |
| 26 | 79.810 | | 1581.26 | .44 |
| 27 | 80.208 | | 4104.44 | 1.09 |
| 28 | 80.506 | t9 t11/t10, t12 | 25729.06 | 7.76 |

*Peak #19 is c9,t11 coeluting with t8,c10. Peak #2 is an 11,13 isomer.

EXAMPLE 2

PIG STARTER RATIONS

| Ingredients | lbs. | kgs. |
|---|---|---|
| Corn, yellow (8.4% protein) | 1067 | 484.7 |
| Soy bean meal, solvent extracted, dehulled (47% protein) | 570 | 259 |
| CFAP | 5 | 2.3 |
| Whey, dried (12.0% protein) | 300 | 136 |
| Dicalcium phosphate | 24 | 11 |
| Limestone | 16 | 7 |
| Iodized salt | 5 | 2 |
| Trace mineral premix | 5 | 2 |
| Vitamin premix | 8 | 4 |
| Totals | 2000 | 908 |

EXAMPLE 3

GROWER-FINISHER RATIONS FOR PIGS
(FROM 40–240 LBS [18–109 KGS])

| Ingredients | lbs. | kgs. |
|---|---|---|
| Corn, yellow (8.4% protein) | 1566 | |
| Soybean meal, solvent extracted (44% protein) | 380 | |

EXAMPLE 3-continued

GROWER-FINISHER RATIONS FOR PIGS
(FROM 40–240 LBS [18–109 KGS])

| Ingredients | lbs. | kgs. |
|---|---|---|
| CFAP | 5 | |
| Dicalcium phosphate | 21 | |
| Limestone | 15 | |
| Iodized Salt | 5 | |
| Trace Mineral Premix | 3 | |
| Vitamin Premix | 3 | |
| Total | 2000 | |

EXAMPLE 4

PIG GROWER FINISHER RATIONS
(FOR PIGS 121–240 LBS [55–109 KGS])

| Ingredients | lbs. | kgs. |
|---|---|---|
| Corn, yellow (8.4% protein) | 1687 | |
| Soybean meal, solvent extracted (44% protein) | 265 | |
| CFAP | 5 | |
| Dicalcium phosphate | 18 | |
| Limestone | 15 | |
| Iodized salt | 5 | |
| Trace mineral premix | 2 | |
| Vitamin premix | 3 | |
| Total | 2000 | |

EXAMPLE 5

COMPOSITION AND ANALYSIS OF PIG TRACE MINERAL REMIX

| Element | Source | Amount (lbs) |
|---|---|---|
| Copper (Co) | Copper Sulfate | 1.500 |
| Iodine (I) | Potassium Iodide | 0.010 |
| Iron (Fe) | Ferrous Sulfate | 25.000 |
| Manganese (Mn) | Manganese Sulfate | 2.500 |
| Selenium (Se) | Sodium Selemite) | 0.025 |
| Zinc (Zn) | Zinc Sulfate | 25.000 |
| | Carrier | 45.965 |
| Total | | 100.000 |

EXAMPLE 6

COMPOSITION OF PIG VITAMIN PREMIX

| Vitamins | Amount |
|---|---|
| Essential | |
| Vitamin A (million IU) | 5.0 |
| Vitamin D (million IU) | 0.6 |
| Vitamin E (thousand IU) | 26.0 |
| Niacin (g) | 25.0 |
| d-Pantothenic acid (g) | 20.0 |
| Riboflavin (g) | 6.0 |
| Vitamin B-12 (mg) | 25.0 |
| Optional | |
| Biotin (g) | 0.3 |
| Menadione (g) | 4.0 |
| Carrier | to 10 lbs |
| Total | 10.0 |

EXAMPLE 7

18% PROTEIN LAYER RATIONS FOR HENS

| Ingredients | lbs. | kgs. |
|---|---|---|
| Ground yellow corn | 1242 | 564.5 |
| CFAP | 5 | 2.3 |
| Alfalfa meal, 17% | 25 | 11.3 |
| Soybean meal, dehulled | 451.6 | 205.3 |
| Meat and bone meal (47%) | 50 | 23.0 |
| DL-methionine | 1.0 | .5 |
| Dicalcium phosphate | 7 | 3.1 |
| Ground limestone | 174 | 79.1 |
| Iodized salt | 7 | 3.1 |
| Stabilized yellow grease | 37 | 17.2 |
| Mineral and vitamin supplements | | |
| Calcium pantothenate (mg) | 5,000 | |
| Manganese (g) | 52 | |
| Selenium (mg) | 90.8 | |
| Zinc (g) | 16 | |
| Vitamin A (IU) | 6,000,000 | |
| Vitamin D$_3$ (IU) | 2,000,000 | |
| Choline (mg) | 274,000 | |
| Niacin (mg) | 12,000 | |
| Riboflavin (mg) | 2,000 | |
| Vitamin B-12 | 6 | |
| Total | 2000 | 909.4 |

EXAMPLE 8
STARTER AND FINISHER RATIONS FOR BROILERS

| | Starter (up to 24 days) | | Finisher (25 days to market) | |
|---|---|---|---|---|
| Ingredients | lbs. | kgs. | lbs. | kgs. |
| Ground yellow corn | 1,106 | 503 | 1235 | 561 |
| CFAP | 5 | 2.3 | 5 | 2.3 |
| Soybean meal. dehulled | 605 | 275 | 120 | 191 |
| Alfalfa meal, 17% | — | — | 25 | 11 |
| Corn gluten meal, 60% | 50 | 23 | 75 | 34 |
| Fish meal, herring, 65% | 50 | 23 | 50 | 23 |
| Meat and bone meal, 47% | 50 | 23 | 50 | 23 |
| Dicalcium phosphate | 10 | 4 | 9 | 4 |
| Ground limestone | 16 | 7 | 14 | 6.3 |
| DL-methionine | 0.8 | 0.3 | — | — |
| Stabilized yellow grease | 101 | 45.7 | 110 | 49.4 |
| Iodized salt | 7 | 3 | 7 | 3 |
| Mineral and vitamin supplement | | | | |
| Calcium pentothenate (mg) | 5,000 | | 5,000 | |
| Manganese (g) | 75 | | 75 | |
| Organic arsenical supplement | 0.1 | | 0.1 | |
| Selenium (mg) | 90.8 | | 90.8 | |
| Zinc (g) | 30 | | 30 | |
| Vitamin A (IU) | 4,000,000 | | 4,000,000 | |
| Vitamin D (IU) | 1,000,000 | | 1,000,000 | |
| Vitamin E (mg) | 2,000 | | 2,000 | |
| Vitamin K (mg) | 2,000 | | 2,000 | |
| Choline (mg) | 503,000 | | 672,000 | |
| Niacin (mg) | 20,000 | | 20,000 | |

-continued

EXAMPLE 8
STARTER AND FINISHER RATIONS FOR BROILERS

| Ingredients | Starter (up to 24 days) | | Finisher (25 days to market) | |
|---|---|---|---|---|
| | lbs. | kgs. | lbs. | kgs. |
| Riboflavin (mg) | 3,000 | | 3,000 | |
| Vitamin B-12 (mg) | 12 | | 12 | |
| Total | 2000.9 | 909.3 | 2000.1 | 909.5 |

EXAMPLE 9
GROWER/FINISHER TURKEY RATIONS

| | Grower (8–16 weeks) | | Finisher (16 weeks-market) | |
|---|---|---|---|---|
| | lbs. | kgs. | lbs. | kgs. |
| Ingredients | | | | |
| Ground yellow corn | 1194 | 595 | 1490 | 677.2 |
| Wheat middlings | 50 | 23 | — | — |
| Alfalfa meal, 17% | 25 | 11.3 | 25 | 11.3 |
| Soybean meal, dehulled | 570 | 259 | 335 | 152.3 |
| Meat and bone meal, 47% | 50 | 23 | 50 | 23 |
| Dicalcium phosphate | 32 | 14.5 | 23 | 10.5 |
| Ground limestone | 14 | 6 | 17 | 8 |
| Stabilized yellow grease | 45 | 20.7 | 45 | 20.7 |
| CFAP | 5 | 2.3 | 5 | 2.3 |
| Iodized Salt | 10 | 4.5 | 10 | 4.5 |
| Mineral and vitamin supplements | | | | |
| Calcium pantothenate (mg) | 4,500 | | 4,500 | |
| Manganese (g) | 30 | | 30 | |
| Selenium (mg) | 181.6 | | 181.6 | |
| Zinc (g) | 30 | | 30 | |
| Vitamin (IU) | 1,500,000 | | 7,500,000 | |
| Vitamin D (IU) | 1,700,000 | | 1,700,000 | |
| Vitamin E (IU) | 10,000 | | 10,000 | |
| Biotin (mg) | 100 | | 100 | |
| Choline (mg) | 388,000 | | 417,000 | |
| Niacin (mg) | 46,000 | | 48,000 | |
| Riboflavin (mg) | 5,000 | | 5,000 | |
| Vitamin B-12 | 6 | | 6 | |
| Total | 2000 | 909.3 | 2000 | 909.3 |

DRY DOG FOOD FORMULA

| Ingredients | Formula 1, % | Formula 2, % |
|---|---|---|
| Meat and bone meal, 50% CP | 8.0 | 15.0 |
| Fish meal, 60% CP, low fat | 5.0 | 3.0 |
| Soybean meal, 44% CP | 12.0 | — |
| Soybean meal, 50% CP | — | 19.0 |
| Wheat germ meal, 25% CP | 8.0 | 5.0 |
| Skimmed milk, dried | 4.0 | 2.75 |
| Cereal grains, mixed | 51.23 | — |
| Corn, flaked | — | 23.25 |
| Wheat bran | 4.0 | — |
| Wheat, flaked | — | 23.35 |
| Animal fat | 1.75 | 2.75 |

-continued

DRY DOG FOOD FORMULA

| Ingredients | Formula 1, % | Formula 2, % |
|---|---|---|
| CFAP | .25 | .25 |
| Steamed bone meal | 2.0 | — |
| Brewers yeast | 2.0 | 5.0 |
| Fermentation solubles, dehydrated | 1.0 | — |
| Salt and trace minerals | 0.5 | 0.5 |
| Vitamin mixture | 0.25 | 0.25 |
| Ferric oxide | 0.02 | — |
| Total | 100.00 | 100.00 |

SEMI-MOIST DOG FOOD FORMULAS

| Ingredients | Formula 1, % | Formula 2, % |
|---|---|---|
| Soy flakes | 30.9 | 33.5 |
| Meat byproducts, 70% moisture | 32.0 | — |
| Meat and bone meal, dehydrated | — | 7.3 |
| Water | — | 25.6 |
| Sugar | 21.0 | 21.0 |
| Calcium and phosphorous supplement | 3.3 | — |
| Soybean hulls | 3.1 | 3.1 |
| Skimmed milk, dried | 2.5 | — |
| Propylene glycol | 2.1 | 2.1 |
| Sorbitol | 2.0 | 2.0 |
| Animal fat | .75 | 3.95 |
| CFAP | .25 | .25 |
| Emulsifiers | 0.9 | — |
| Potassium sorbate | 0.35 | 0.35 |
| Salt | 0.6 | 0.6 |
| Vitamins | 0.25 | 0.25 |
| Total | 100.000 | 100.000 |

What is claimed is:

1. An animal feed made by the method comprising:

a) providing a seed oil having a linoleic acid content of at least 50 percent, said seed oil selected from sunflower oil and safflower oil;

b) subjecting said seed oil to solvent extraction, fat splitting and alkali treatment under conditions such that an isomerized preparation is created, wherein at least 50 percent isomerization of linoleic acid to conjugated linoleic acid is obtained;

c) treating said isomerized preparation under conditions such that aqueous and non-aqueous fractions are generated, said non-aqueous fraction comprising said conjugated linoleic acid;

d) separating said non-aqueous fraction from said aqueous fraction; and e) formulating an animal feed with said non-aqueous fraction.

2. An animal feed made by the method comprising:

a) providing a seed oil selected from sunflower oil and safflower oil;

b) subjecting said seed oil to conditions such that an isomerized preparation is created comprising conjugated linoleic acid;

c) treating said isomerized preparation under conditions such that aqueous and non-aqueous fractions are generated, said non-aqueous fraction comprising said conjugated linoleic acid;

d) separating said non-aqueous fraction from said aqueous fraction without distillation; and e) formulating an animal feed with said non-aqueous fraction.

* * * * *